No. 693,535. Patented Feb. 18, 1902.
G. H. TINGLEY.
CIGAR BUNCHING MACHINE.
(Application filed Apr. 19, 1901.)
(No Model.) 8 Sheets—Sheet 3.

FIG. 3.

WITNESSES:
Levi L. Salisbury
Grace E. Smith

INVENTOR
George H. Tingley.
BY Geo. H. Remington & Co.
ATTYS.

No. 693,535. Patented Feb. 18, 1902.
G. H. TINGLEY.
CIGAR BUNCHING MACHINE.
(Application filed Apr. 19, 1901.)
(No Model.) 8 Sheets—Sheet 4.

WITNESSES:

INVENTOR:
George H. Tingley.
ATTYS

No. 693,535. Patented Feb. 18, 1902.
G. H. TINGLEY.
CIGAR BUNCHING MACHINE.
(Application filed Apr. 19, 1901.)
(No Model.) 8 Sheets—Sheet 6.

WITNESSES:

INVENTOR:
George H. Tingley.

No. 693,535. Patented Feb. 18, 1902.
G. H. TINGLEY.
CIGAR BUNCHING MACHINE.
(Application filed Apr. 19, 1901.)
(No Model.) 8 Sheets—Sheet 7.

WITNESSES:
Levi E. Salisbury
L. E. Smith

INVENTOR:
George H. Tingley.
BY Geo. H. Remington & Co.
ATTYS

No. 693,535. Patented Feb. 18, 1902.
G. H. TINGLEY.
CIGAR BUNCHING MACHINE.
(Application filed Apr. 19, 1901.)

(No Model.) 8 Sheets—Sheet 8.

WITNESSES: INVENTOR:
Levi E. Salisbury George H. Tingley.
G. E. Smith. BY Geo. H. Remington & Co.
ATTYS

UNITED STATES PATENT OFFICE.

GEORGE H. TINGLEY, OF PROVIDENCE, RHODE ISLAND, ASSIGNOR TO THE UNITED STATES CIGAR MANUFACTURING COMPANY, OF PROVIDENCE, RHODE ISLAND, A CORPORATION OF MAINE.

CIGAR-BUNCHING MACHINE.

SPECIFICATION forming part of Letters Patent No. 693,535, dated February 18, 1902.

Application filed April 19, 1901. Serial No. 56,609. (No model.)

*To all whom it may concern:*

Be it known that I, GEORGE H. TINGLEY, a citizen of the United States of America, and a resident of Providence, in the county of Providence and State of Rhode Island, have invented certain new and useful Improvements in Cigar-Bunching Machines, of which the following is a specification.

My invention is an improvement in "cigar-bunching machines," so called; and it consists in the novel features of construction and the arrangement and combination of the parts thereof, all as will be more fully hereinafter set forth and claimed.

In the accompanying eight sheets of drawings.

I would state here that the machine forming the subject of this application for patent is more especially adapted and arranged to produce charges made from "long fillers" as distinguished from other and prior machines employed in the manufacture of charges containing "scrap" or fine tobacco. While the latter machines cannot be used for feeding long fillers, but are adapted solely for producing charges having scrap fillers, as just stated, my improved cigar-bunching machine may be successfully used for producing both of the types or kinds of charges referred to.

The following is a more detailed description of my improved cigar-bunching machine:

A, referring to the drawings, designates the machine as a whole. It has vertical side frames *a a*, carrying the several instrumentalities and supported on a base or table *a'*. I would state in passing that the tobacco or long filler is fed from the table mechanism E into the pockets of the cylinder B at the front end of the machine, while the apron-controlling mechanism is located at the rear end, the cylinder itself being mounted at or near the center or intermediate of the said front and rear ends. While the machine may be made to operate by power automatically, the drawings represent it as being adapted to be actuated by two attendants, one for feeding the fillers to the cylinder and rotating it, the duties of the other one being to discharge the material from the pockets onto the apron and then to operate the latter, whereby the fillers are reduced to the desired form, followed by applying the binder, thus completing the charge. The charges thus produced are subsequently molded or shaped as desired and covered with wrappers in any well-known manner, thereby completing the manufacture of the cigar. This latter operation, however, forms no part of my present invention.

I will now first describe the construction of the cylinder B and its several attachments or devices and the means for operating the same. The cylinder is secured to the shaft $b$, mounted to revolve in bearings formed in the upper central portion of the two side frames $a$ $a$. (See Figs. 1, 2, and 4.) The cylinder proper consists of the two laterally-separated disk-shaped heads $b'$ and the annular rim $b^4$, having, as drawn, a series of eight longitudinally-extending recesses or pockets $b^3$ formed in its peripheral surface. The size and also to some extent the form of these pockets determine the quantity of tobacco or fillers which is to enter into the cigars to be produced. The said rim $b^4$ is secured to the heads by means of screws $b^5$. Each filler-pocket $b^3$ has fitted therein a radially-movable piston or ejector $c$, Figs. 4, 6, 7, &c., having downwardly-extending end arms $c^3$, each carrying an outwardly-projecting pin $c^5$, on which is mounted a small roll $c^4$. The said ejectors are further provided with fixed guides or pins $c'$, extending through the bottom wall of the pockets, on which are mounted helical springs $c^2$. These springs are arranged within the cylinder, so as to automatically maintain the ejectors in the normal position or at the bottom of the pockets. (See Figs. 4, 5, and 9.) Each of the heads $b'$ of the cylinder is provided with a series of radial slots $b^2$, arranged to receive the said rolls $c^4$. The free ends of the pins $c^5$, carrying the rolls, extend beyond the ends of the cylinder, so as to engage a block or crosshead D, slidably fitted in a slotted opening $a^4$, formed in the said central portion of each of the side frames $a$. The said central portions, which are substantially semicircular in form, are united transversely by the sheet-metal casing or housing $a^2$, terminating at its front end or side in an adjustable cutter or knife $a^3$.

Figure 14:
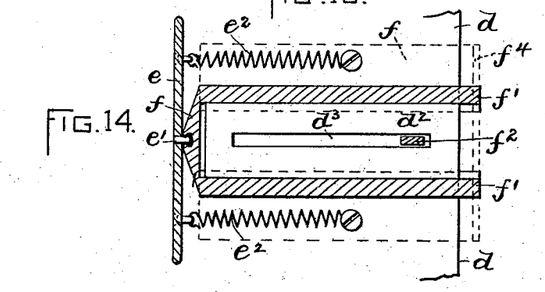
Fig. 14 is a horizontal sectional view taken on line 14 14 of Fig. 4.

The filler-feeding mechanism E is arranged on a table $d$, secured to the side frames $a$ and extending outwardly beyond the latter, as clearly shown. A thin flat plate $f$, having gibs $f'$ on its under side, is fitted to slide longitudinally on the ways $d^2$ of the table $d$. The latter is provided with a central slot $d^3$, through which a lug $f^2$ of the plate extends downwardly. To this lug or arm is attached a flexible connection $f^3$, passing over a guide-sheave $f^5$, carrying one or more weights $w$ at its lower end. To the forward end of said plate $f$ is hinged or pivoted the horizontal compressor-bar $e$, (see Figs. 4, 14, and 22,) adapted to work in the feeding-trough chamber $d^5$ for the purpose of compressing the fillers into the charging-pockets $b^3$ of the cylinder. As drawn, the top or upper side wall of said trough consists of the spring-pressed bar $h^4$, fixed pieces $h^3$ and $d^4$, and intermediate cover $h$. The bar $h^4$ is located contiguous to the knife and forms a scraper or clearer in that it serves to prevent the mass of tobacco from rising from the trough when the cylinder is rotated, while at the same time keeping the knife clean and maintaining the stock remaining in the trough after it has been severed from the charge in the pocket in position to be acted upon by the said compressor-bar $e$ in forcing the fillers into the next succeeding pocket after the cylinder has been brought to a state of rest. The trough or chamber $d^5$ is charged with fillers introduced by the attendant after first lifting the hinged cover $h$. The form of the chamber $d^5$ transversely is substantially the same as the shape of the cigars to be produced.

Figure 2:
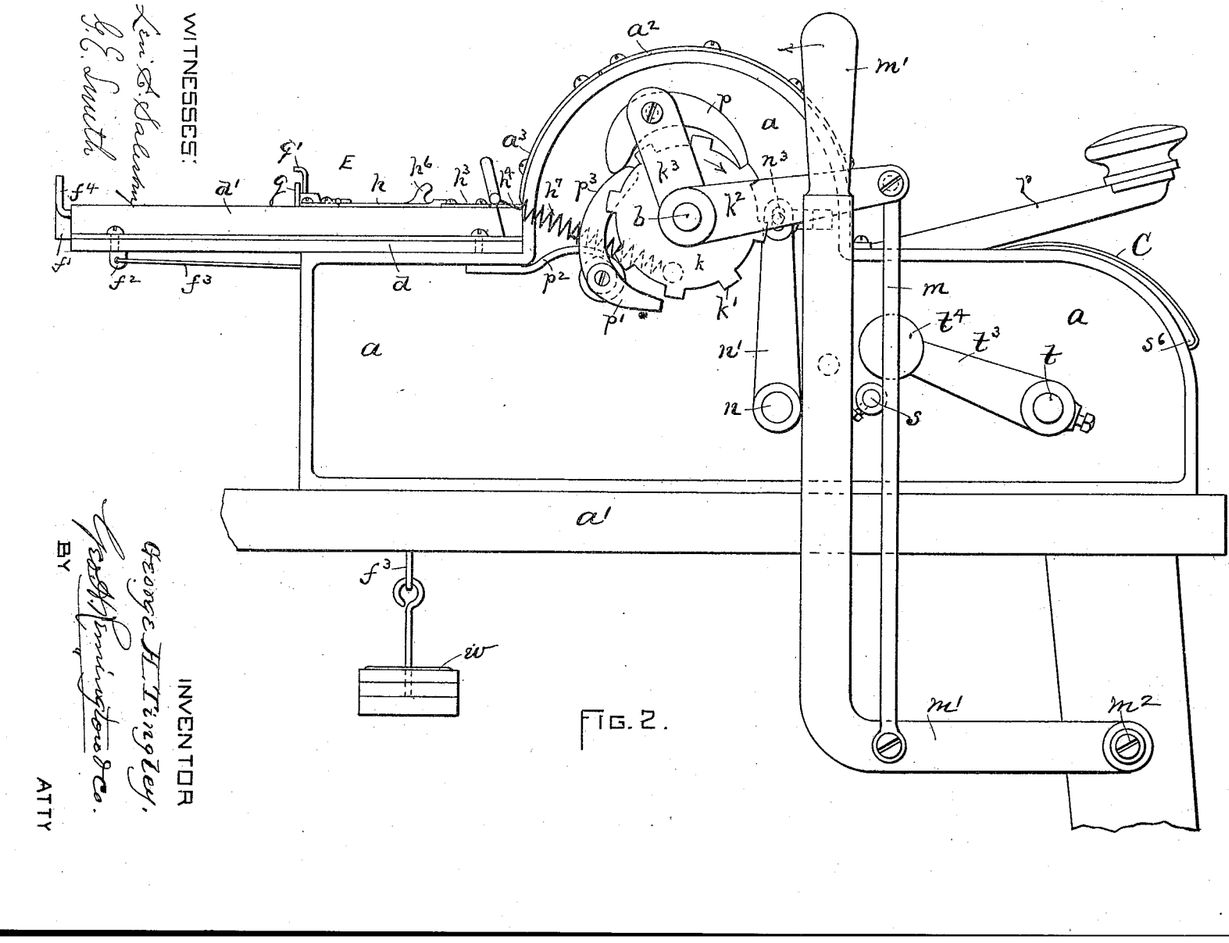
Fig. 2 is a corresponding elevation view showing the opposite side of the machine.
Figure 3:
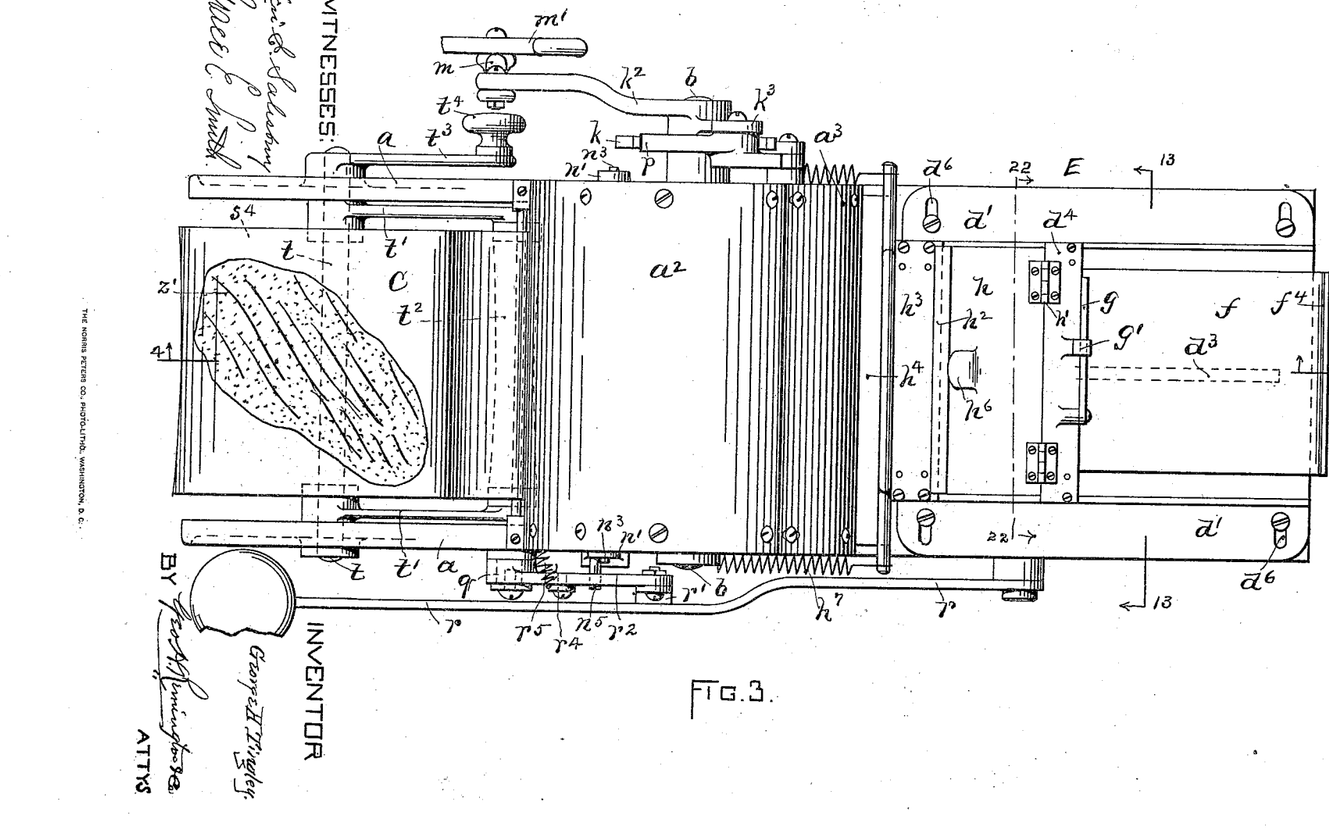
Fig. 3 is a plan view.
Figures 7, 8, 9, 10:
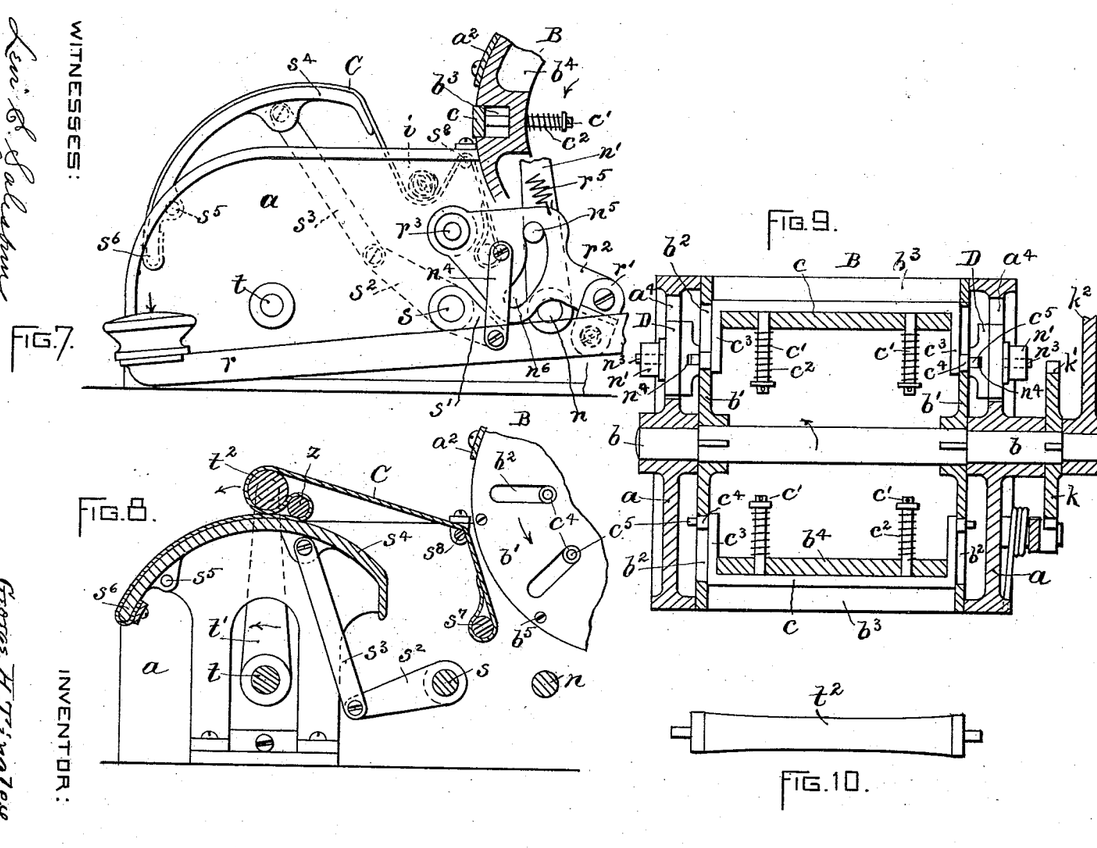
Fig. 7 is a partial side elevation, partly in section, showing the relation of the ejectors, &c., at the instant of discharging the filler or charge from the pocket into the depressed apron.
Fig. 8 is a partial sectional view showing the apron in the act of rolling the charge therein.
Fig. 9 is a horizontal sectional view taken on line 9 9 of Fig. 1.
Fig. 10 is a side view of the bunch-forming apron-roll.

The mechanism through which the cylinder is rotated, say, one-eighth of a revolution and then locked in position is best represented in Figs. 2, 3, and 9 and is as follows: To the portion of the shaft $b$ extending through the right-hand frame of the machine is secured a wheel $k$, having a series of eight lugs or teeth $k'$ formed on its periphery. A bell-crank lever $k^2$ is loosely mounted on the end of said shaft, one arm being jointed to a vertical connection or link $m$, in turn jointed to a bent operating-lever $m'$, fulcrumed at $m^2$ to the leg or frame of the machine. The other arm $k^3$ of lever $k^2$ has a dog $p$ pivoted thereto, arranged to engage said teeth $k'$ and rotate the wheel in the arrow direction upon manipulating the lever $m'$. (See Fig. 2.) At a point below said dog $p$ is pivoted another dog $p'$. This latter forms a stop for the cylinder and locks it in position while the exposed or open pocket is being charged with the fillers. It will be seen that the dog $p'$ has a rearward extension $p^3$, adapted to be engaged by a corresponding extension of the driving-dog $p$. Now upon advancing the latter to rotate the cylinder the other dog will be released, thus permitting the short end of the dog $p'$ to swing into the corresponding notch of the wheel $k$. A suitable spring $p^2$ is employed to depress the dog and maintain it in engagement with the teeth $k'$ until it is again tripped or released. This latter action is effected by returning the lever $m'$, &c., to the normal position, (shown in Fig. 2,) the opposite end of dog $p$ during said movement having engaged the extension or rear end of the dog $p'$ and forced the latter outwardly, (resisted by spring $p^2$,) thus disengaging it from the wheel. The several parts remain in this position until the operating-lever is again vibrated to rotate the cylinder, as before stated.

Figure 1:
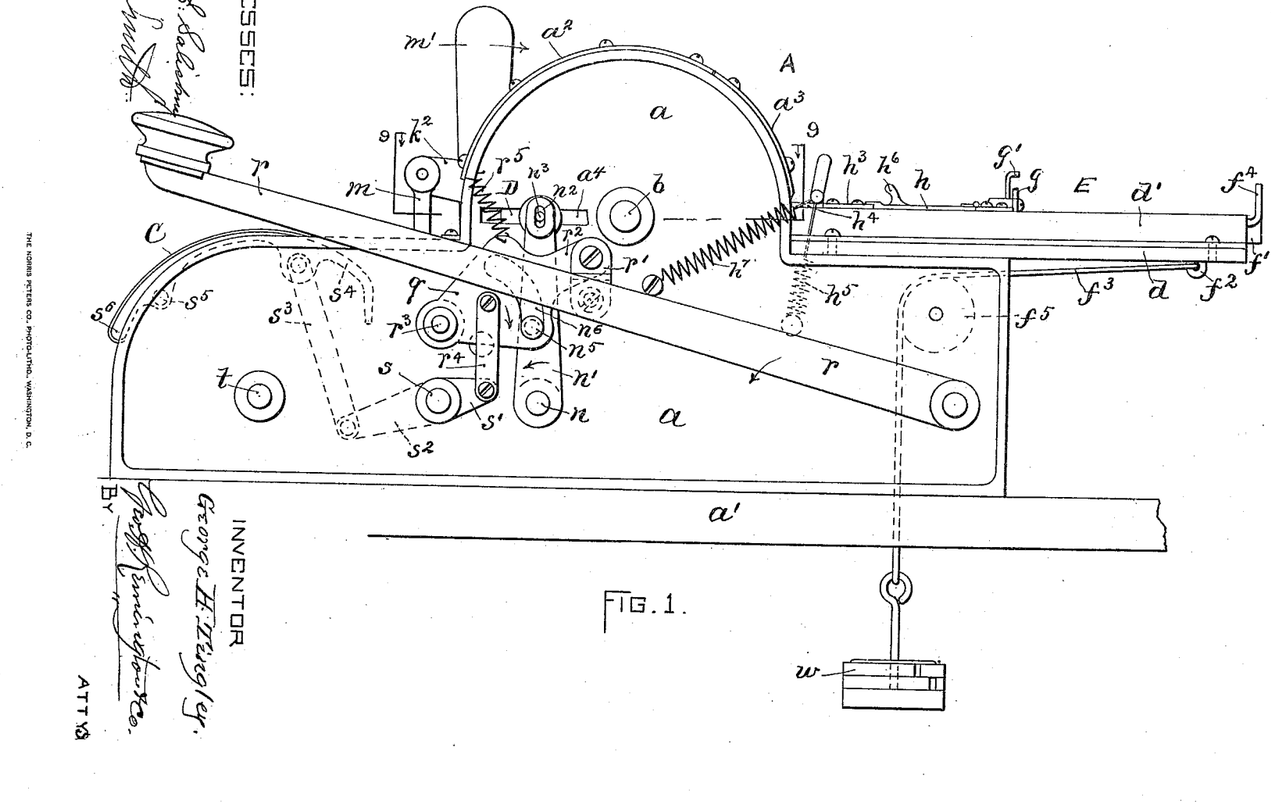
Figure 1 is a side elevation of my improved cigar-bunching machine.

The charge-ejecting mechanism is actuated and controlled by the other attendant, sitting at the rear end of the machine. A shaft $n$ extends transversely through the lower portion of the side frames $a$ and has secured thereto at each end thereof a vertically-arranged exterior lever $n'$, having a slotted opening $n^2$ formed in its upper end or eye, in which a pin $n^3$, projecting from the said crosshead D, extends. It will be seen, referring to Fig. 9, that the cross-head has a vertically-arranged opening $n^4$, located in the path of the pin $c^5$ of the ejector. I would state that when the cross-head and ejector members are in the normal or retracted position, as shown in Figs. 1 and 9, the cylinder upon being rotated one-eighth of a revolution will cause the pin $c^5$ to enter said opening $n^4$. At the left side of the machine is located a swinging operating-lever $r$, jointed to a short link $r'$, in turn jointed to the outer end $r^2$ of a quadrant-arm $q$. This latter arm is fulcrumed at $r^3$ to the frame and has a cam-shaped slot $n^6$ therethrough, in which a roll or pin $n^5$ is loosely fitted, said pin being carried by one of the said levers $n'$. Thus it will be seen that upon depressing the operating-lever $r$ the connected members will be actuated in the arrow direction to force the ejector outwardly and discharge the charge of fillers from the corresponding pocket of the cylinder. Fig. 7 shows the relative positions of the parts. Upon removing pressure from the lever $r$ a spring $r^5$ automatically returns the several parts to the normal or retracted position. (Shown in Fig. 1.) I would add that the form and arrangement of the said cam-slot $n^5$ is such that the lever $n'$ is prevented from vibrating or is practically locked in position while the cylinder is being rotated, thereby insuring that the pins $c^5$ properly enter the open slots $n^4$ of the respective cross-heads D before the latter are actuated to discharge the charges from the pockets through the medium of the ejector $c$. The said spring $r^5$ further assists in maintaining the parts in the normal position.

The charge-rolling mechanism is constructed, arranged, and adapted to operate as follows: At the rear end of the machine is pivoted at $s^5$ a swinging apron or belt-supporting table $s^4$, having a curved form, the front end being bent downwardly. To the under side of this table is jointed a connection $s^3$, in turn jointed to the outer end of an arm $s^2$, secured to a horizontal rocker-shaft $s$, extending transversely of the machine and located below the said quadrant-arm $q$. The shaft extends through the side frame and has a short lever $s'$ secured to it, a link $r^4$ being jointed to both the said levers $q$ and $s'$, as clearly shown. (See Figs. 1, 4, 7, and 8.) As thus constructed and connected it is obvious that the act of depressing the operating-lever $r$ will impart an initial upward movement to the table $s^4$ and the bunch-rolling flexible apron C, resting thereon. (See Fig. 7.) One end of the apron is secured at $s^6$ to the table, the other end being looped around a rod $s^7$, located near the surface of the cylinder B. (See Fig. 4.) When the parts are in the normal position, as shown in the last-named figure, quite a depression or pocket $i$ is formed in the apron, such length of the apron being necessary to properly roll the bunch between its folds, as will be described later. If the charge of fillers should now be discharged into this comparatively deep pocket, the charge is liable to become more or less disintegrated or disarranged. Therefore in order to overcome the defect the table $s^4$ is adapted, by means of the mechanism just described, to swing upwardly simultaneously with or slightly in advance of the discharge of the charge from the cylinder. This action of the table, &c., greatly lessens the depth of the pocket $i$, so that the charge falls into it practically intact. In this position, too, it will be seen that the lever $r$ is depressed to its limit. Now in order to complete the rolling or shaping of the charge I employ the following mechanism: At or near the forward end of and below the apron is mounted a revoluble roll $t^2$, journaled in laterally-separated arms $t'$, secured to a shaft $t$, extending transversely of the machine. (See Figs. 3 and 4.) One end of said shaft projects through the side frame, so as to receive a crank-handle or working lever $t^3$, the latter being set substantially parallel with the roll-carrying arms $t'$. At or about the same instant that the apron is raised to the position shown in Fig. 7 by the depressed action of the lever $r$ the attendant next seizes the crank-handle $t^3$ and swings the latter upwardly, thereby carrying the roll $t^2$ ahead and in advance of the charge lying in the pocket $i$, the continued rotary movement of the handle in the arrow direction serving to inclose the fillings $z$ in the die of the apron, as shown in Fig. 8. This latter operation, however, forms no part of my present invention. It should be stated that before the charge has been completely rolled a binder or flat leaf $z'$ of tobacco is properly placed upon the apron C, (see Fig. 3,) so as to be taken up and rolled around the fillings $z$. By swinging the roll $t^2$ rearwardly to its limit the bunch will have been completed and the fillings covered with said binder and also discharged from the bight of the apron into any suitable receptacle placed contiguous to the rear end of the machine. The table $s^4$ and roll $t^2$ are made slightly concave longitudinally, as indicated in Figs. 10 and 3, whereby they are adapted to impart to the charges discharged from the cylinder a convex shape even though the form of the charging-pockets $b^3$ of the cylinder be rectangular and straight.

Figure 22:
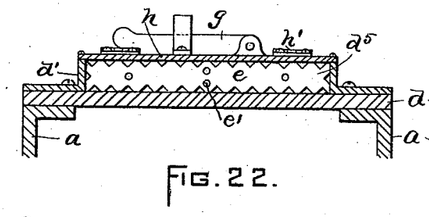
Fig. 22 is a transverse sectional view of the feeding device, taken on line 22 22 of Fig. 3, the fillers being omitted.

The following describes the manner of operation of the several instrumentalities embodied in my improved cigar-bunching machine in producing the bunches: The fillers or tobacco in a loose state is placed horizontally and parallel in the chamber $d^5$ of the feeding-trough, the cover $h$ being first raised for the purpose and having the plate $f$ and its connected plunger $e$ retracted and held in position by the swinging catch $g$, as shown in Figs. 1, 3, 4, and 13. The cover is next closed and the catch $g$ withdrawn, thereby releasing the plunger, &c., which immediately advance and press the fillers directly into the open pocket $b^3$ of the then stationary cylinder, the degree of pressure or compression being that due to the force of the weights $w$. It may be stated here that the amount of weight or pressure required in the charge may be varied according to the quality and condition of the tobacco used and also to the desired density of the bunch to be produced. Now assuming, say, that the three preceding pockets of the cylinder have been successively charged and still contain the fillers therein by means of the encircling casing $a^2$ the operator next seizes the working lever $m'$ in her right hand and pulls it toward her to its limit, thereby, through the medium of the dog $p$ and its wheel $k$, turning the cylinder one-eighth of a revolution and bringing the first-charged pocket in position preparatory to discharging the charge therefrom onto the apron. During the said movement of the cylinder the lower or cutting edge of the curved fixed knife $a^3$ will shear off the fillers in the adjacent pocket from the column of fillers in the trough $d^5$, the spring-pressed scraper $h^4$ at the same time clearing the knife and bearing yieldingly upon the tobacco and preventing the latter from being drawn upwardly from the trough. This action of the cylinder will have caused the extensions $c^5$ of the ejector $c$ of the first of the four now charged pockets to enter the open vertical slots $n^4$ of the cross-heads D. The act of thus rotating the cylinder also brings the next succeeding empty pocket $b^3$ in position, so as to register with the trough-chamber, at which instant, if there be sufficient material in the trough, the weight $w$ further advances the plunger $e$ and presses the fillers into said pocket. Meanwhile the other attendant depresses to its limit the lever $r$ with her right hand, thereby elevating the apron C and its table $s^4$, such action at the same time, through the medium of the moving cross-heads D, forcibly ejecting the charge from the uncovered pocket onto the apron, the corresponding relation of the parts then being substantially as represented in Fig. 7. This attendant next with her left hand grasps the crank-lever $t^3$ $t^4$ and swings it upwardly toward her, thereby advancing the forming-roll $t^2$ beyond the charge of fillings $z$ and inclosing the latter in the bight of the apron, as shown in Fig. 8. The continued movement of the crank will cause the charge of fillings to engage with and be enveloped by a suitably-arranged binder $z'$, Fig. 3, previously placed upon the apron, the final action of the crank being to further roll and shape the bunch and discharge it from the apron, thus completing the bunch-forming operation. I would state that the construction and manner of mounting the plunger $e$ are such that it is adapted to yield from its normal position (shown in Fig. 14) in case the attendant should place the fillers so unevenly in the trough-chamber that a greater quantity of them lies on one side of the center of the trough than on the other. In such event the plunger in advancing will swing sidewise on its pivot $e'$ and form an angle with the plane of the movable plate $f$, to which it is attached. The tendency of the oppositely-arranged springs $e^2$, connected with the plunger, is to maintain the latter in its normal position. While the catch $g$ is adapted to prevent the plate $f$ from being retracted too far in that direction, the opposite end of the slot $d^3$, through which the lug $f^2$ extends, serves as a stop for limiting the forward movement of the plate, the arrangement being such that the forcing-plunger cannot enter the charging-pockets of the cylinder. The upper edge of the plunger may be notched at intervals, as shown in Fig. 22, thereby reducing its surface contact with the top wall of the trough and insuring more uniform action.

Figure 15:
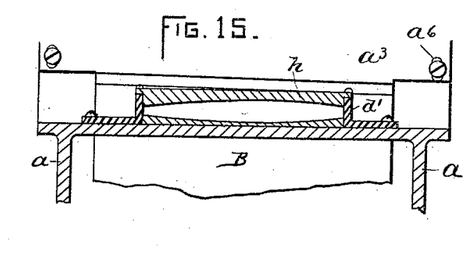
Fig. 15 is a cross-sectional view of the feeding-trough contiguous to the face of the cylinder, showing a modified form of the feeding space or chamber arranged to produce charges adapted later to be made into "Perfecto" cigars.
Figure 16:
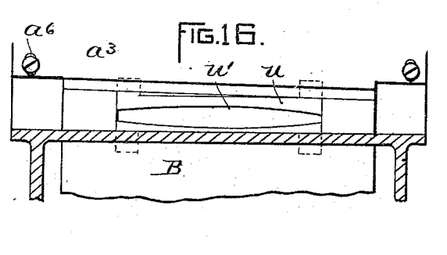
Fig. 16 is a partial side view of the cylinder, showing a charge-forming pocket provided with lining members arranged to receive the filler from said trough.
Figures 17, 19:
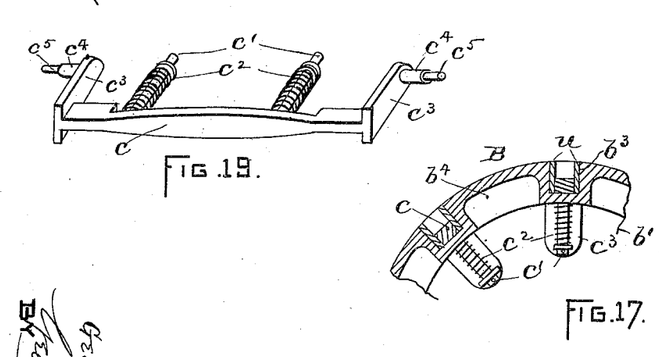
Fig. 17 is a partial transverse sectional view of the cylinder, showing the said lining members mounted in the pockets.
Fig. 19 is a perspective view of the ejector adapted to be employed in combination with the lining members.
Figure 18:
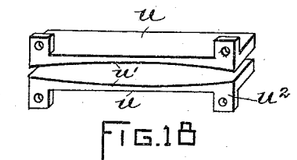
Fig. 18 is a perspective view of said lining members detached.
Figure 20:
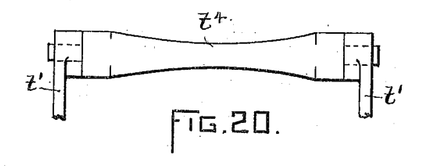
Fig. 20 is a side view of the apron-roll used in forming the bunch adapted later to be formed into a "Perfecto" cigar.
Figure 21:
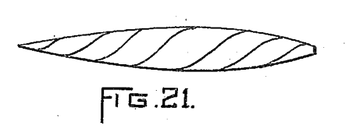
Fig. 21 represents a cigar having the "Perfecto" shape.

In Figs. 15 to 20, inclusive, I have represented portions of the machine as arranged to produce charges having approximately the form of a "Perfecto" cigar. In order to adapt the machine to this purpose, the cylinder-pockets have secured therein upper and lower removable lining pieces or members $u$, having oppositely-concaved faces $u'$. (See Figs. 16 and 18.) In this case the ejectors $c$ are correspondingly modified, as shown in Fig. 19, wherein the shape of the portion uniting the two ends and constituting the bottom of the charging or cylinder pockets is substantially the same as the space or chamber formed between the adjacent sides of the lining-pieces $u$. Fig. 15 shows a transverse sectional view of the feeding-trough as modified to conform to the shape of the cylinder-pocket shown in Fig. 16. I prefer in most cases that the form of the feeding-chamber be substantially the same as that of the cigars to be produced, although I have demonstrated that by providing the machine with a feeding-chamber and pockets having a form substantially as represented cross-sectionally in Fig. 23 the charges thus produced and discharged from the cylinder onto the apron may be readily rolled so as to make bunches adapted when finished to form "Perfecto" cigars.

Figures 23, 27:
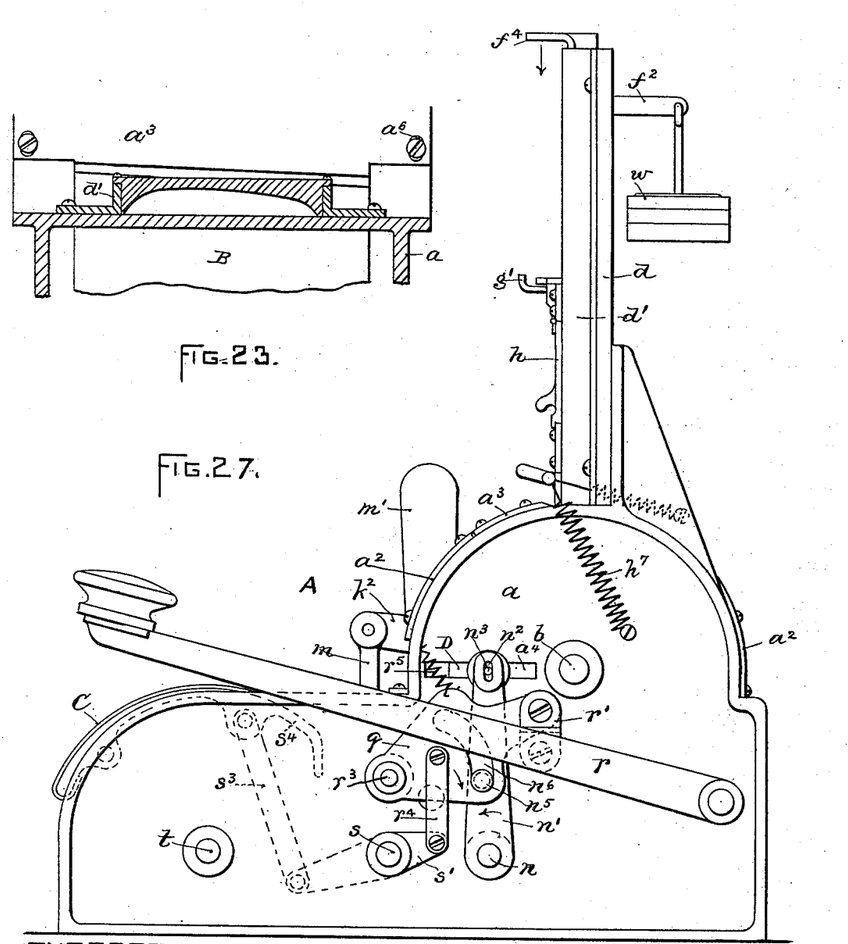
Fig. 23 is a cross-sectional view similar to Fig. 15, showing another modification of the shape of the feeding-trough and pocket.
Fig. 27 is a side elevation similar to Fig. 1, showing a modified arrangement of the feeding device.

In Fig. 27 I have represented a side elevation of my improved cigar-bunching machine as provided with certain novel features or modifications—that is to say, in this case the machine as a whole is substantially the same as represented in Fig. 1; but in lieu of feeding the fillers to the cylinder-pockets on a horizontal plane, thereby requiring the presence of two attendants, one for feeding the tobacco to the cylinder and the other to discharge the charges therefrom and complete the rolling of the bunches, I am now enabled to dispense with one attendant, although possibly the output may be slightly lessened. The improvement referred to is effected by placing the feeding mechanism in a vertical position, as shown, the arrangement being such that the operator facing the trough introduces the fillers therein through the opening after lifting the cover $h$. The weighted plunger next descends and forces the material into the corresponding open pocket of the cylinder registering with the trough. The subsequent operations of rotating the cylinder, discharging the charge of fillers $x$ from the pocket onto the apron C, and then rolling and binding the charge are the same as hereinbefore described, and clearly illustrated in the several drawings.

Figure 11:
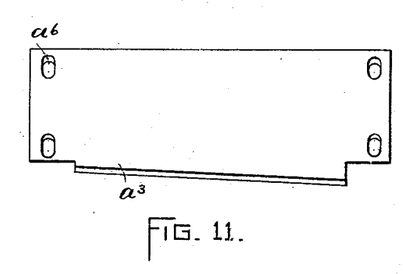
Figs. 11 and 12 are side and end views of the knife.
Figure 12:
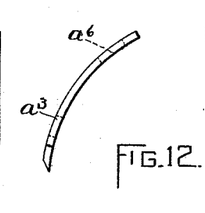

In order to adapt the machine so as to produce charges varying in length, the sides $d'$ of the feeding-trough are capable of being moved in a lateral direction, the slots $d^6$, through which the securing-screws pass, permitting such adjustment, as shown in Fig. 3. The cutting or shearing knife $a^3$ is adapted to be adjusted with respect to the charged cylinder-pocket by first loosening the screws passing through the corresponding slotted openings $a^6$ at each end of the knife, as shown in Figs. 11 and 12.

Figures 4, 5, 6:
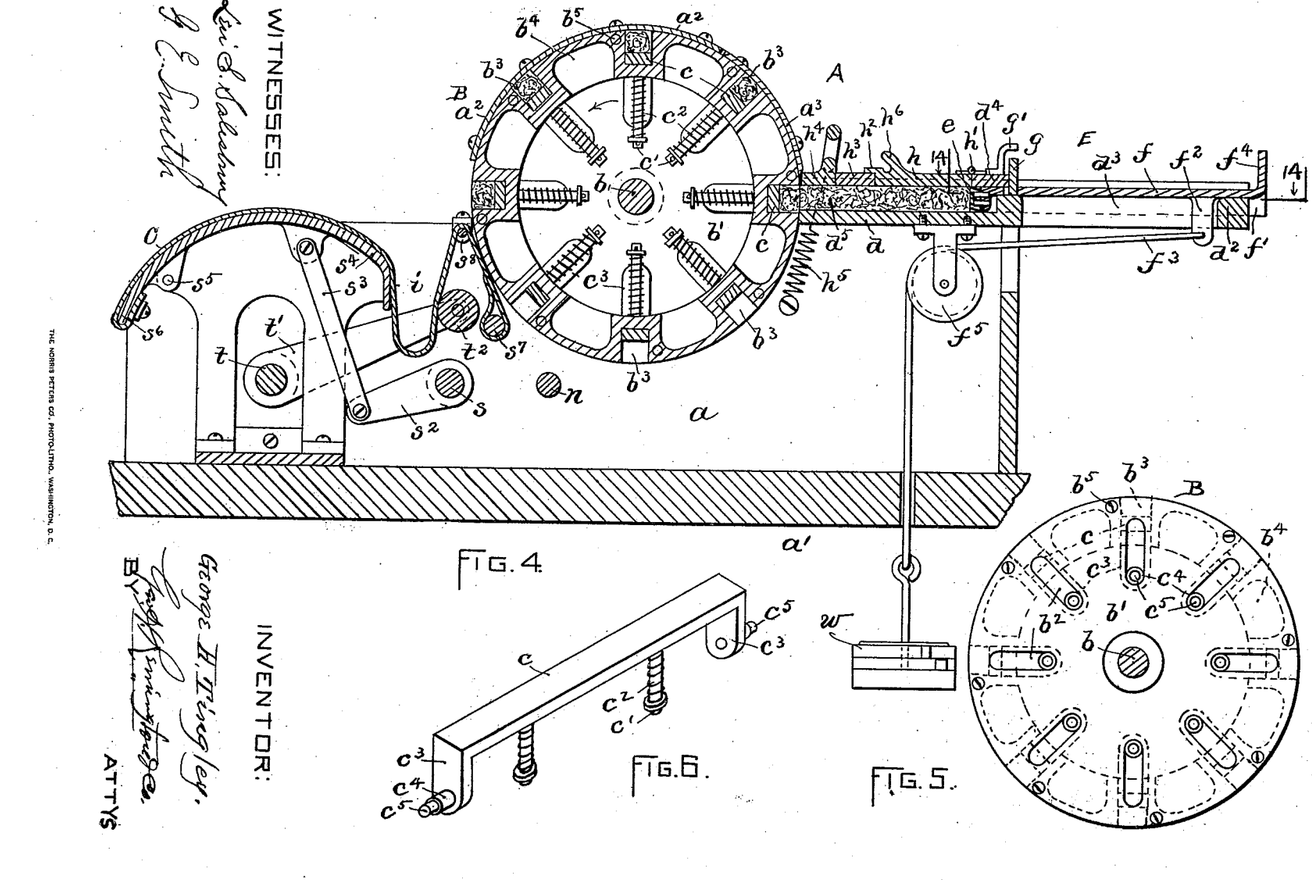
Fig. 4 is a longitudinal sectional view taken substantially through the center of the machine or on line 4 4 of Fig. 3. The relation of the several parts to one another in the preceding figures are alike.
Fig. 5 is an end view of the charging-cylinder detached from the machine.
Fig. 6 is a perspective view of one of the filler-ejectors adapted to form the bottom of the cylinder-pockets.

For the purpose of maintaining the apron C in position and at the same time forming a support therefor at a point contiguous to the discharging-pocket of the cylinder I employ a small rod or roll $s^8$, as shown in Figs. 4, 7, and 8.

Figures 13, 24:
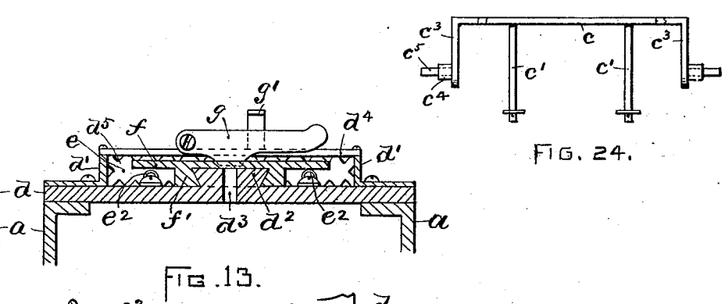
Fig. 13 is a transverse sectional view taken on line 13 13 of Fig. 3.
Figs. 24, 25, and 26 are side views showing a modification of the charge-ejector, the springs being omitted.
Figure 25:
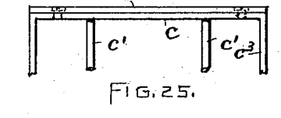
Figure 26:
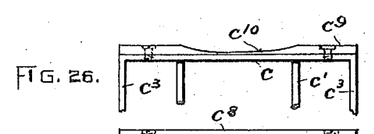

In Figs. 24, 25, and 26 I have represented a modification of the ejector $c$. In this case the thickness of the flat base portion uniting the two depending ends or arms $c^3$ is made somewhat thinner than as shown in Figs. 4, 6, 9, 19, &c. In order to adapt the pockets $b^3$ of the cylinder to produce charges having a less quantity of fillers than would be required when the ejector shown in Fig. 24 is used, a plate $c^8$ is removebly secured to the face of the member $c$, as indicated in Fig. 25. In such case the form of the buenh produced from the charge is substantially cylindrical. By simply substituting the plate $c^9$ shown in Fig. 26 for said plate $c^8$ it will be seen that the charges produced in the pockets thus arranged will be somewhat thicker in the center than at the ends. This result is mainly due to the fact that the working face of the ejector is made concave. (See $c^{10}$.) When this latter arrangement is employed, together with the concave roll $t^4$ and said apron C and its table $s^4$, the rolled bunch is adapted to be converted into a cigar having the "Perfecto" shape.

I am aware that cigar-bunching machines provided with feeding mechanisms and with revoluble cylinders having charging-pockets therein and with mechanically-actuated aprons arranged to successively receive the charges of fillers from the pockets and transform them into bunches have been devised prior to my invention. Therefore I do not claim such organized mechanism broadly; but What I do claim is—

1. In a cigar-bunching machine, the combination of an intermittingly-revoluble cylinder B provided with a series of peripheral charging-pockets, independently-movable ejectors forming the bottom of said pockets, means for feeding the tobacco or fillers into the pockets, a clearer $h^4$ in close proximity to the pocket being charged and bearing yieldingly upon the tobacco or fillers, a suitably mounted and actuated apron and roll located contiguous to the said cylinder and opposite the point where the charges are fed into the pockets, a stationary knife for shearing off surplus fillers projecting beyond the last-charged pocket, a curved shield or guard forming a cover for the filled pockets, and means for actuating the ejectors successively at substantially the same instant that the forward charged pocket is exposed below said guard, whereby the corresponding charge of fillers is discharged into the die or bight formed in said apron, which latter is adapted to cover the charge with a binder and transform it into a bunch, substantially as described.

2. In a cigar-bunching machine, the combination with a revoluble charging-cylinder B, having a series of pockets $b^3$ formed in its periphery, and guided spring-pressed ejectors $c$ forming the bottom of said pockets, and provided with end arms and projecting pins $c^5$, of two oppositely-arranged slidable cross-heads D each having a groove or opening therein located in the path of and adapted to receive said pins $c^5$, and means, substantially as described, for simultaneously actuating said cross-heads, whereby the corresponding ejector is forced outwardly to discharge the charge of fillers from its pocket, substantially as described.

3. In a cigar-bunching machine, the combination with the revoluble charging-cylinder B having a series of filler-receiving pockets $b^3$ formed in its periphery, and means, substantially as described, for discharging the charges of fillers from the pockets, of a feeding-trough in direct communication with the pockets, one at a time, a weighted feed-plate and plunger having a flexible connection with the weights thereon adapted to force the fillers into the pocket at any desired pressure, a stationary knife adapted upon revolving the cylinder to shear off any surplus tobacco projecting from the charged pocket, and the spring-pressed bar or clearer $h^4$ located at the mouth of said trough adapted to bear yieldingly upon the fillers in the trough and at the same time form a clearer or scraper to the knife, substantially as described.

4. In a cigar-bunching machine, the combination with a revoluble cylinder provided with a series of charging-pockets, of a feeding-trough into which the fillers are placed, a plate slidably mounted in said trough, a catch or stop for limiting the movement of the plate, and a spring-pressed or yielding plunger e hinged or jointed to the plate, whereby the plunger is adapted to automatically yield or swing sidewise so as to maintain a substantially equal pressure upon the column of fillers in the trough, substantially as described.

5. In a cigar-bunching machine, a suitably-mounted shaft, a charging-cylinder secured thereto, a notched wheel $k$ secured to said shaft, an operating-lever having a driving-dog $p$ indirectly connected therewith and in engagement with said wheel, whereby the cylinder is capable of being intermittently rotated, and a spring-pressed locking-dog $p'$ arranged to engage said wheel to maintain the cylinder in its normal or charging position; the rear ends of said dogs being extended, whereby the driving-dog in its rearward movement rides upon the locking-dog and releases the latter from the wheel, preparatory to again rotating the cylinder, substantially as described.

6. In a cigar-bunching machine, the combination with the revoluble cylinder B provided with charging-pockets, and the filler-receiving trough communicating with said pockets, of a weight-actuated plate $f$ mounted in said trough having a yielding or swinging plunger $e$ adapted to press directly against the fillers in the trough, a lid or cover $h$ for closing the feed-opening in the trough, and a yielding bar or clearer $h^4$ forming the upper portion of the mouth of the trough adapted to bear directly on the fillers, substantially as described and for the purpose set forth.

7. In a cigar-bunching machine, the combination with the cylinder B, having filler-receiving pockets $b^3$ and ejectors $c$ forming the bottom of said pockets, and the bunch-forming roll and its apron C, of the operating-lever $m'$ and the mechanism connected therewith whereby the cylinder may be rotated so as to present the next succeeding pocket in position, the working lever $r$ and mechanism connected therewith adapted to force said ejectors outwardly in a successive manner to discharge the charge of fillers from the respective pockets onto the said apron, substantially as described.

8. In a cigar-bunching machine, the combination of the cylinder B provided with a series of peripherally-arranged charging-pockets adapted to receive the fillers, means for intermittingly rotating the cylinder, a corresponding series of radially-arranged spring-pressed ejectors forming the bottom of said pockets mounted within the cylinder and having lateral projections extending through slotted openings formed in its end walls, and mechanism, consisting of suitably actuated and controlled cross-heads D, substantially as described, arranged to engage said projections, whereby the ejectors are forced outwardly in a successive manner to discharge the fillers from the pockets.

Signed at Providence, Rhode Island, this 22d day of March, 1901.

GEORGE H. TINGLEY.

Witnesses:
AUGUSTUS J. RICHARDS,
GEO. H. REMINGTON.